United States Patent [19]
Bailey et al.

[11] Patent Number: 4,616,218
[45] Date of Patent: Oct. 7, 1986

[54] ADJUSTABLE CRT DISPLAY

[75] Inventors: Edward L. Bailey, Rochester; Raymond L. Cimijotti, Chatfield; Levern H. Lowrie, Rochester, all of Minn.

[73] Assignee: International Business Machines Corporation, Armonk, N.Y.

[21] Appl. No.: 455,086

[22] Filed: Jan. 3, 1983

[51] Int. Cl.⁴ .................. G09G 1/00; A47B 91/00
[52] U.S. Cl. ............................. 340/720; 340/700; 248/349; 248/178; 358/248
[58] Field of Search .......... 358/248, 249; 340/700, 340/720; 248/179, 183, 184, 186, 178, 371

[56] References Cited

U.S. PATENT DOCUMENTS

| | | | |
|---|---|---|---|
| 3,789,140 | 1/1974 | McQueen et al. | 358/249 |
| 4,365,779 | 12/1982 | Bates et al. | 248/179 |
| 4,368,867 | 1/1983 | Pendleton et al. | 248/178 |
| 4,372,515 | 2/1983 | Noonan | 358/249 |
| 4,410,159 | 10/1983 | McVicker et al. | 248/349 |
| 4,453,687 | 6/1984 | Sweere | 248/183 |
| 4,483,503 | 11/1984 | Gahan | 248/349 |

FOREIGN PATENT DOCUMENTS

| | | | |
|---|---|---|---|
| 866494 | 4/1961 | United Kingdom | 358/249 |
| 2111357 | 6/1983 | United Kingdom | 358/248 |

OTHER PUBLICATIONS

*Byte* magazine, p. 93, Feb. 1982.

*Primary Examiner*—Gerald L. Brigance
*Attorney, Agent, or Firm*—Laurence R. Letson

[57] ABSTRACT

A CRT data display comprises a display head of significant weight which may be moved vertically with the aid of constant force springs and which may be tilted to adjust the position of the CRT for operator comfort. The display may be rotated about a vertical axis to permit multiple viewing positions.

10 Claims, 6 Drawing Figures

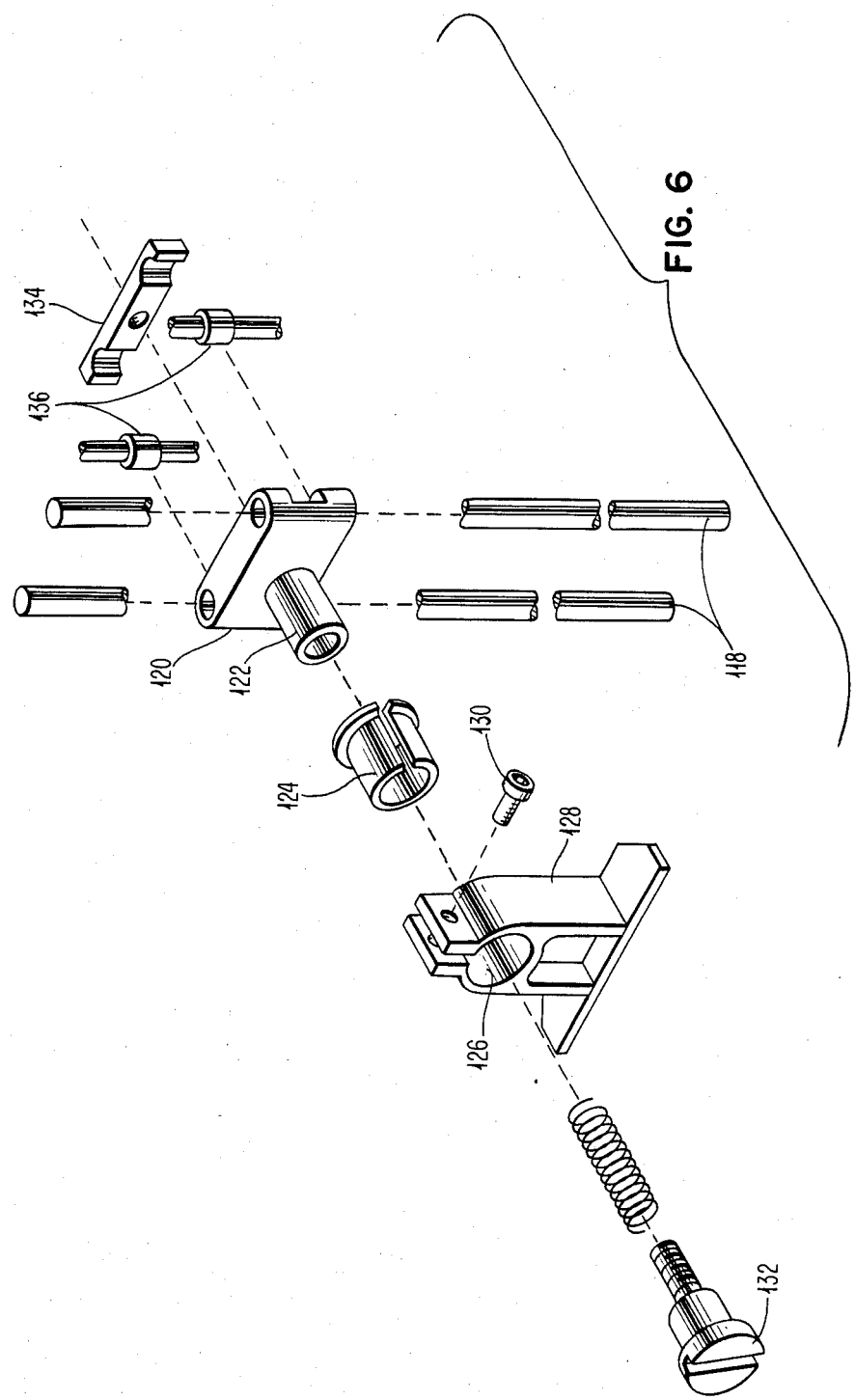

ADJUSTABLE CRT DISPLAY

BACKGROUND OF THE INVENTION

This invention relates to the field of display terminals and particularly to video screen display terminals which are vertically adjustable.

Video terminals having a screen similar in configuration to that of a television set have become very widespread in their use in office environments. With a vast number of people using display terminals, emphasis on ease and comfort has become more important. The adjustability of the position of the video screen in front of the operator for personal comfort requires the raising or lowering of the screen within limits to accommodate different preferences of the operator. The adjustability of the screen allows the operator to place the screen at a comfortable position and thus reduce or eliminate fatigue.

A significant problem in the adjustment of the video screen is the weight of the display head which typically contains the CRT, the associated electrical controls and circuits for generating the image on the CRT face and a frame and power supply associated therewith.

The weight of these combined components is a significant amount and therefore is difficult to raise and lower, particularly when working from the front of a work station or desk and having to normally reach past a keyboard or other piece of equipment in order to adjust the display head height.

With a significant weight attributed to the display head, a degree of physical strength is required. Many of the operators of data terminals are women who may not possess adequate physical strength to lift such a substantial weight at arm's length.

SUMMARY OF THE INVENTION

The data terminal display is provided with constant force springs of sufficient strength to offset the weight of the display and make it considerably easier to raise and lower the display. The display may be further mounted such that its base is capable of pivoting to accommodate viewing from several lateral positions. The mounting of the display head and its supporting frame relative to the supporting constant force springs may permit tilting of the display unit about its horizontal axis to position the display head to reduce fatigue and/or glare.

The display head is configured such that the supporting constant force springs and the uprights supporting the constant force spring assembly are containable within the housing of the display head and thus provide a contained appearance.

The movement of the head vertically with respect to the uprights is controlled such that undesired movement does not occur unless initiated by the operator due to a detenting or latching arrangement thereby preventing the head from being bumped and caused to either move or displace itself from the desired vertical positioning.

DESCRIPTION OF THE DRAWINGS

FIG. 6 is an exploded view of the tilt mechanism for the display head illustrated in FIG. 4.

DETAILED DESCRIPTION OF THE INVENTION

Figure 1:
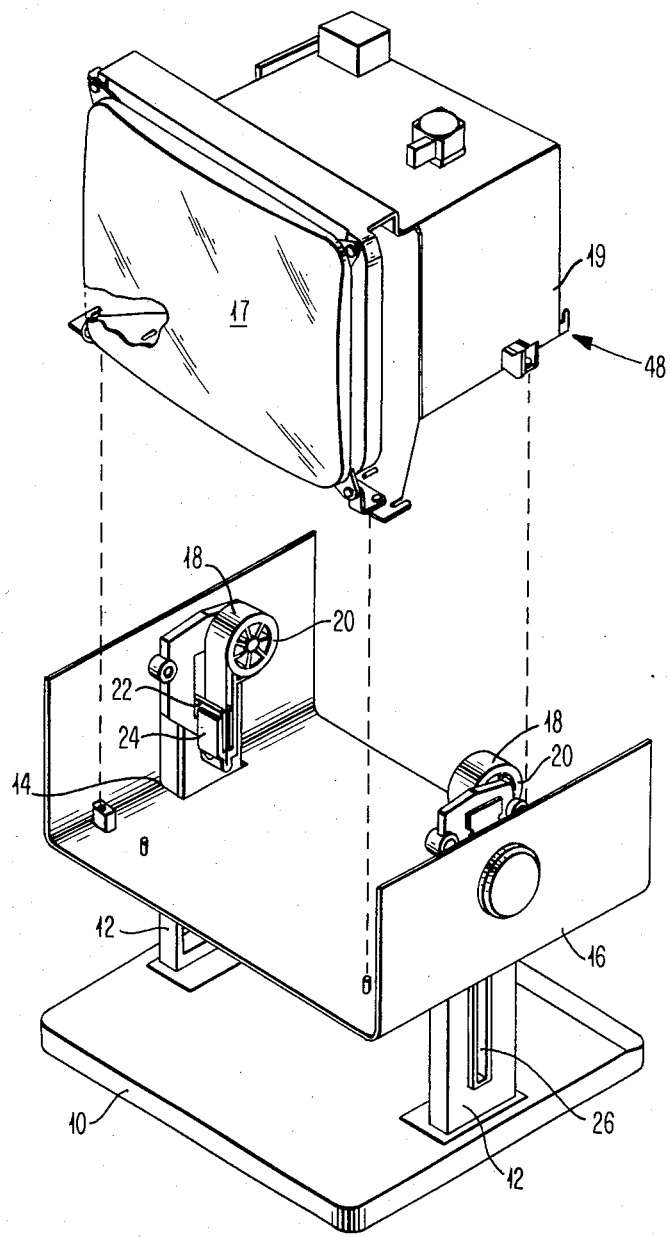
FIG. 1 is a partially exploded view of the display terminal with the video screen and the associated electronics removed from the housing.

Referring to FIG. 1, the display terminal is illustrated in a partially exploded view. The base 10 is configured to provide a support for uprights 12. Uprights 12 extend parallel to each other and through apertures 14 in the floor of the bottom housing 16 which supports the chassis 48 comprising CRT 17 and associated circuitry 19. Supported on uprights 12 are constant force springs 18 which are coiled onto reels 20. The free end of the constant force springs 18 are attached to a lift plate 22. The attaching technique of attaching to lift plate 22 may involve conventional techniques or may involve an anchor device 24 which allows the constant force spring 18 to slip into the lift plate 22 and the anchor 24 then holds the constant force spring 18 against lift plate 22. Lift plate 22 is capable of riding vertically in a slot 24 best illustrated in FIGS. 2 and 3. Lift plate 22 extends through the slot and forms an attachment with bracket 28. Bracket 28 may be attached to lift plate 22 which is illustrated in its entirety in FIG. 3. Lift plate 22 includes the guiding surfaces 30 which will engage the sides of slot 26 and thus stabilize lift plate 22 in its vertical movement. The attachment of bracket 28 and lift plate 22 together with a friction shaft 32 is accomplished by a screw 44.

Bracket 28 may be tightened onto friction shaft 32 by means of screw member 45. This allows bracket 28 to be rotated with respect to lift plate 22. The tilt function is accomplished by bracket 28 pivoting about stud 32. The tilt travel is contained by slot 46 and stop 47. Slot 46 in bracket 28 provides stop surfaces for rotation friction shaft 32 and has stop 47 which contacts stop surfaces in slot 46. Tilt force is controlled by deflecting member 49 of bracket 28. Screw member 45 provides force to member 49 to cause its deflection against shaft 32. Lugs 52 which are part of stud 32 engage slots 51 which are part of lift plate 22 and prevents motion between stud 32 and lift plate 22.

Bracket 28 is engageable with and attached to the bottom cover 16 of the display station or display chassis 48. Thus, to rotate bracket 28 slightly with respect to lift plate 22 and uprights 12 will cause a slight tilting of the display station.

Release member 34 may also be configured such that the end thereof will protrude through the opening 36 in lift plate 22 and engage latching spring 38. The engagement of the latching spring 38 will be at the top end thus acting to force tabs 40 out of complimentary engaging notches 42 in the structure of upright 12. Spring 38 and tabs 40 act to prevent undesired vertical movement of lift plate 22 and bracket 28. When the tabs 40 are disengaged from the notches 42, then lift plate 22 is then free to move under external force influence. Upon the release of spring 38, the tabs 40 will reengage with notches 42 a part of upright 12, thereby locking the lift plate 22 to which spring 38 is attached in the set vertical position.

The constant force spring 18 is coiled on spool 20 which in turn is mounted on and rotates about shaft 43 of upright 12. The constant force spring's free end is fixedly attached to the anchor 24 which, as previously described, is capable of engaging the underside of lift plate 22 to provide a force upward thereto. The constant force spring 18 is configured such that it normally attempts to wrap itself about spool 20 and to maintain itself tightly coiled thereon. The force of uncoiling the spring 18 from spool 20 is the spring force of the member and, as such, will tend to be equal regardless of the extent of uncoiling accomplished.

Figure 2:
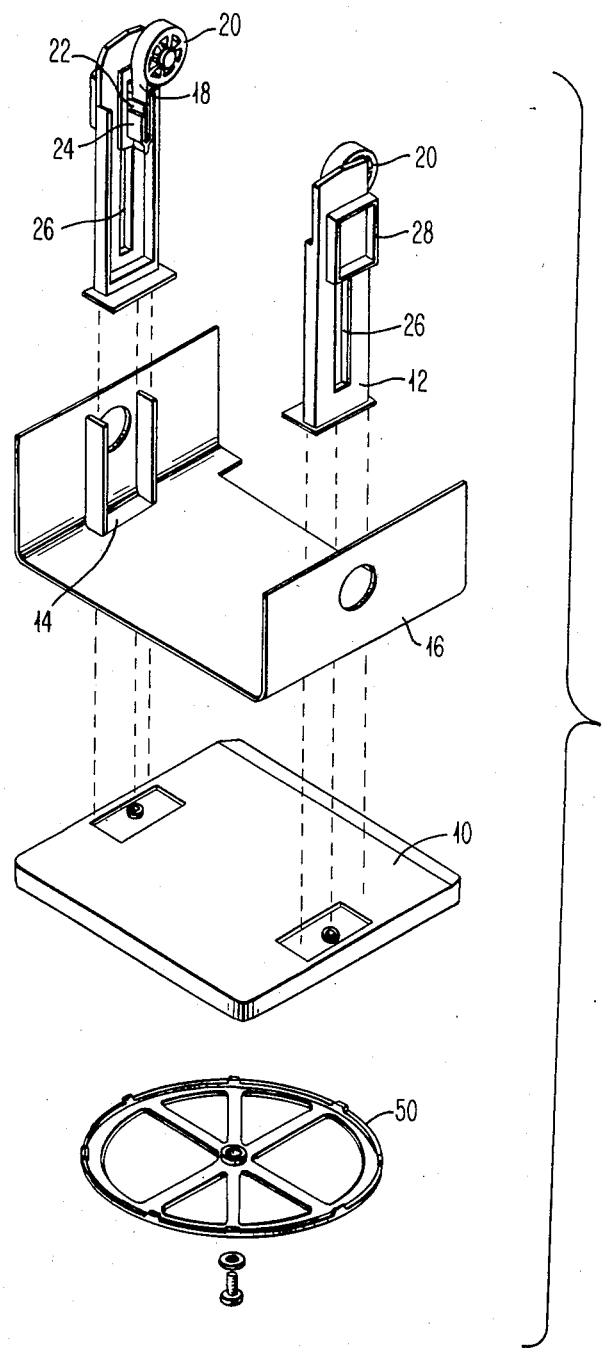
FIG. 2 is a further perspective exploded of the display housing base and uprights.
Figure 3:
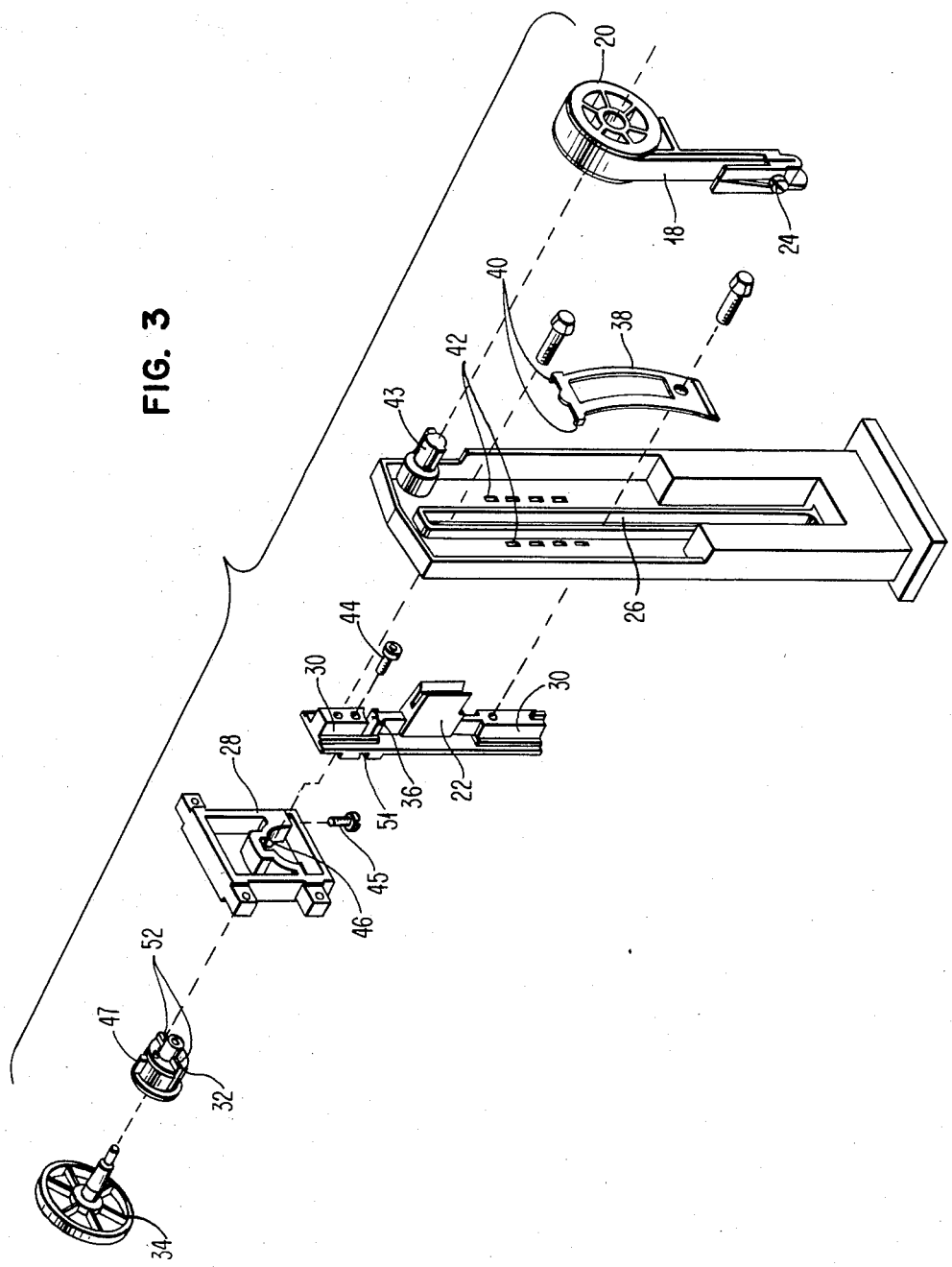
FIG. 3 is a perspective exploded view of a typical upright assembly and constant force spring.
Figure 4:
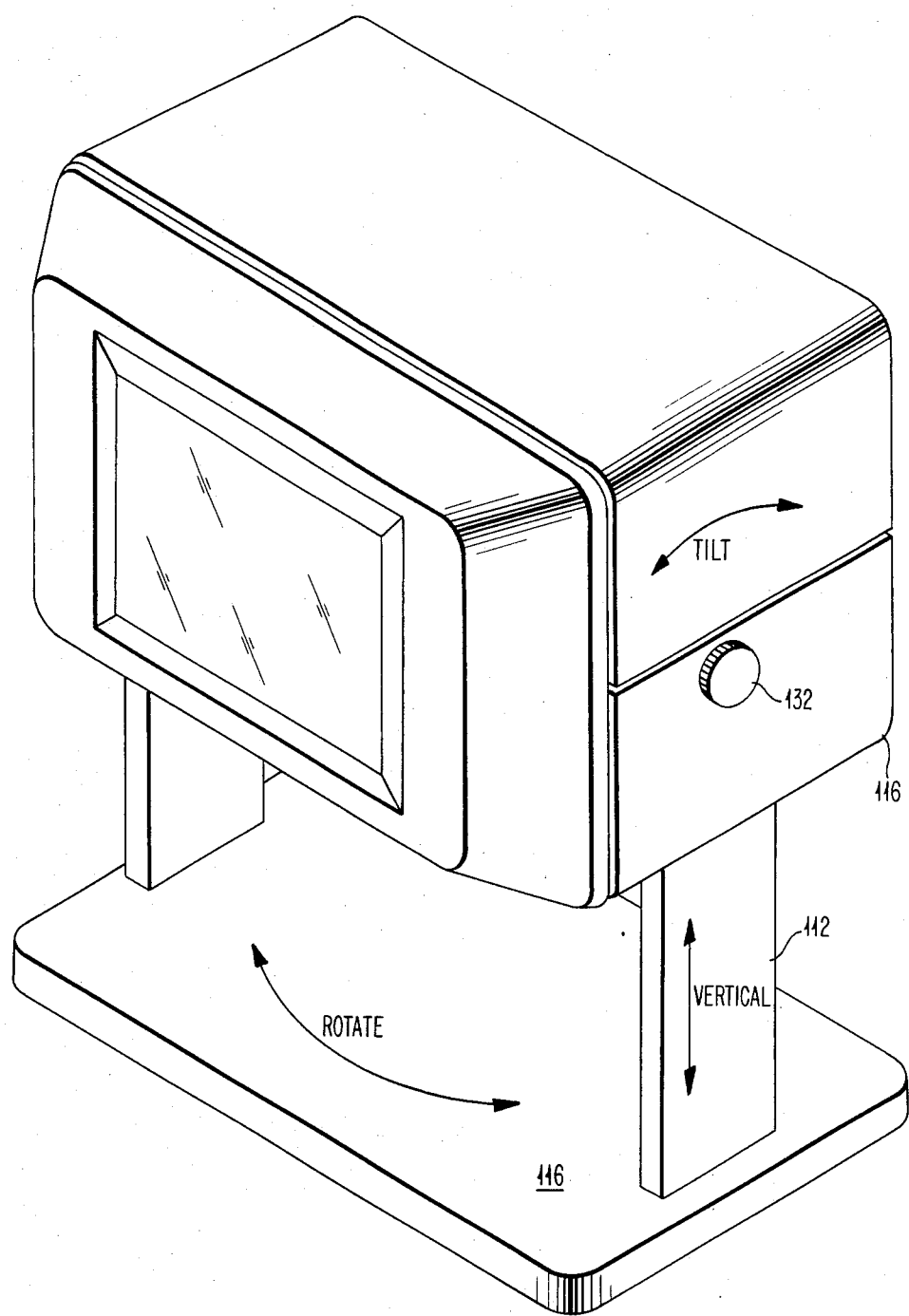
FIG. 4 is a perspective view of an alternate embodiment terminal display.

An additional enhancement to the terminal display in FIG. 1 may be the addition of a rotational support such as that shown in FIG. 2. With the addition of the rotational support 50, the base member 10 may then be turned relative to the furniture element such as a table or desk upon which the terminal is sitting.

Figure 5:
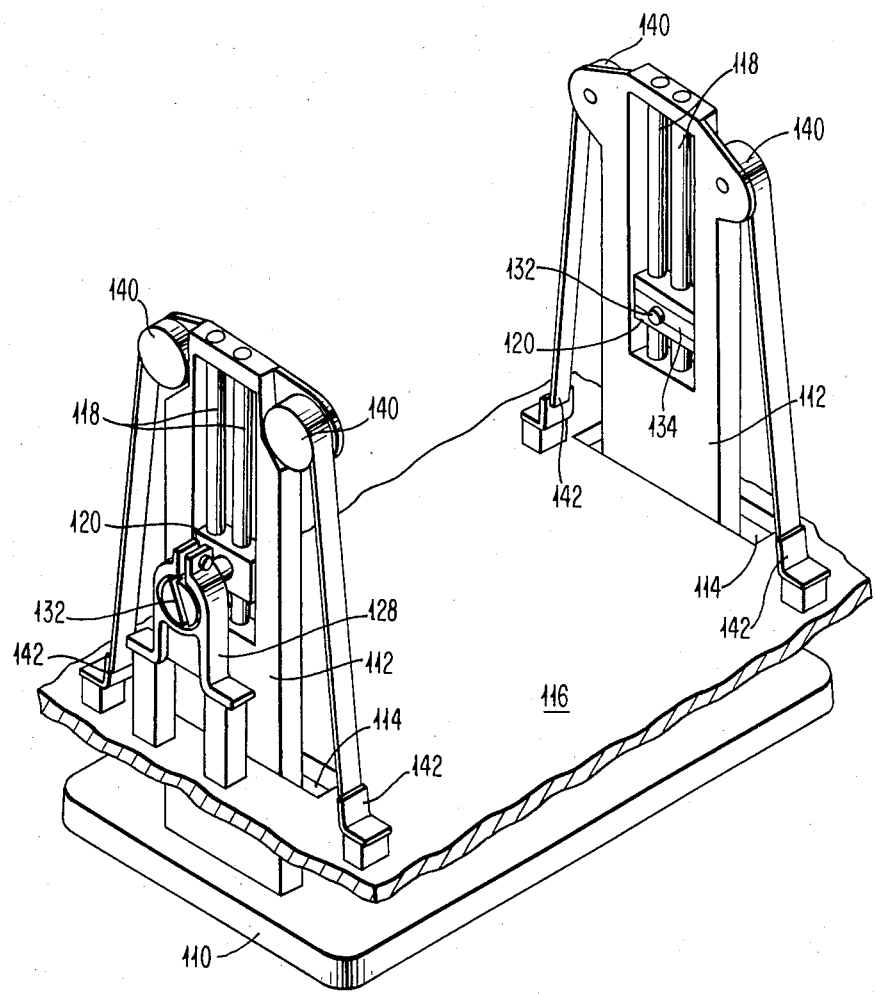
FIG. 5 illustrates the constant force spring suspendion of the terminal display head in FIG. 4.

An alternative embodiment is illustrated in FIG. 5. The display station comprises a base 110 together with uprights 112. The bottom cover 116 is provided with apertures 114 to allow the cover to ride down over the uprights 112. Supported in the uprights 112 are guide rods 118 which serve as guide ways for the bearing block 120. Attached to the bearing block are short stub shafts extending outward from the bearing block and best observable in FIG. 6. The stub shaft 122 is hollow to permit an adjustment screw to pass therethrough. Tilt sleeve 124 is engageable with the exterior of the stub shaft 122 and will fit within the interior cylindrical surface 126 of support block 128. Support block 128 is a split block which may be tightened onto sleeve 124 by means of screw 130. Support block 128 is likewise attachable either directly or indirectly to the display case 116 in FIG. 5. Adjustment screw 132 is engageable through and coaxial with support block 128, tilt sleeve 124 and bearing block 120 to engage in a threaded fashion with break bar 134. Brake bar 134 is formed such as to engage the circumference on at least a portion of the exterior of brake sleeves 136 which may be then compressed by tightening adjustment screw 132 to limit vertical movement of bearing block 120 with respect to guide rods 118. By loosening screw 130, the support block may be tilted with respect to bearing block 120 and guide rods 118. With the attachment of the display bottom cover 116 to the support block 128, a tilting of the support block will cause a tilting of the display case and the display terminal.

Referring again to FIG. 5, uprights 112 also provide a support for the constant tension spring assemblies 140. The constant tension springs 140 extend downward are rigidly attached at attachment points 142 either directly or indirectly to the display case 116.

I claim:

1. A data entry display station comprising:
   a base,
   a display head,
   at least one vertical column defining limits of travel of said display head,
   a constant force spring means supported by said column and attached to said display head to support at least a portion of the weight of said head,
   means for retaining said head in a plurality of selected positions intermediate said limits of travel relative to said column.

2. The station of claim 1 wherein said means for retaining said head further comprises a latching means for preventing vertical movement of said head with respect to said column and means for permitting and preventing tilting of said head relative to said column.

3. The station of claim 1 wherein said station comprises two columns.

4. The station of claim 3 wherein said columns contain a plurality of constant force springs.

5. The station of claim 3 wherein each of said columns contain therein a plurality of said constant force springs.

6. The station of claim 1 wherein said base is further mounted on a support means.

7. The station of claim 6 wherein said support means further comprises means for allowing rotational movement of said base relative to said support means.

8. A data entry display station for electronic data processing comprising:
   a base,
   a pair of spaced-apart vertical columns mounted on said base,
   a relatively massive positionable display head riding on said columns and vertically adjustable within limits therein,
   constant-force (negator) spring means mounted in said columns for counterbalancing the weight of said display head, and
   locking means for positively holding the display head at selectable vertical positions on the columns intermediate said limits.

9. The display station of claim 8 wherein said base further comprises means for rotationally supporting said station to permit rotation of said station about a vertical axis.

10. The display station of claim 8 comprising means for adjustably positioning said display head about a horizontal axis therethrough.

* * * * *